United States Patent [19]

Neff

[11] 4,407,323

[45] Oct. 4, 1983

[54] CARTRIDGE TYPE PILOT VALVE

[75] Inventor: James A. Neff, Bloomfield Township, Oakland County, Mich.

[73] Assignee: MAC Valves, Inc., Wixom, Mich.

[21] Appl. No.: 353,045

[22] Filed: Mar. 1, 1982

[51] Int. Cl.³ .............................................. F16K 25/00
[52] U.S. Cl. ................................. 137/454.2; 137/315; 137/625.65
[58] Field of Search .......................... 137/454.2, 625.65

[56] References Cited

U.S. PATENT DOCUMENTS

| | | | |
|---|---|---|---|
| 2,656,983 | 10/1953 | Grayson | 137/454.2 X |
| 3,640,304 | 2/1972 | Fox | 137/454.2 X |
| 3,704,727 | 12/1972 | Adahan | 137/625.65 |
| 4,051,862 | 10/1977 | Haytayan | 137/454.2 |
| 4,074,700 | 2/1978 | Engle | 137/625.65 X |
| 4,139,020 | 2/1979 | Sebo | 137/454.2 |

Primary Examiner—Harold W. Weakley
Attorney, Agent, or Firm—Robert G. Mentag

[57] ABSTRACT

A three-way normally closed only, pilot air valve for supplying pressurized pilot air to a directional flow control air valve, such as a four-way valve, a three-way valve, a two-way valve or the like, for shifting the main valve spool of such valves. The valve includes a valve body having a pilot air inlet port, a cylinder port, and an exhaust port. A tubular valve retainer member having an axial bore formed therethrough is releasably mounted in the valve body. A first passageway connects the pressurized pilot air inlet port to the cylinder port. A second passageway connects the cylinder port with the exhaust port.

A captive poppet valve spool is movably mounted in the valve retainer member for controlling the flow of air through the two passageways.

7 Claims, 4 Drawing Figures

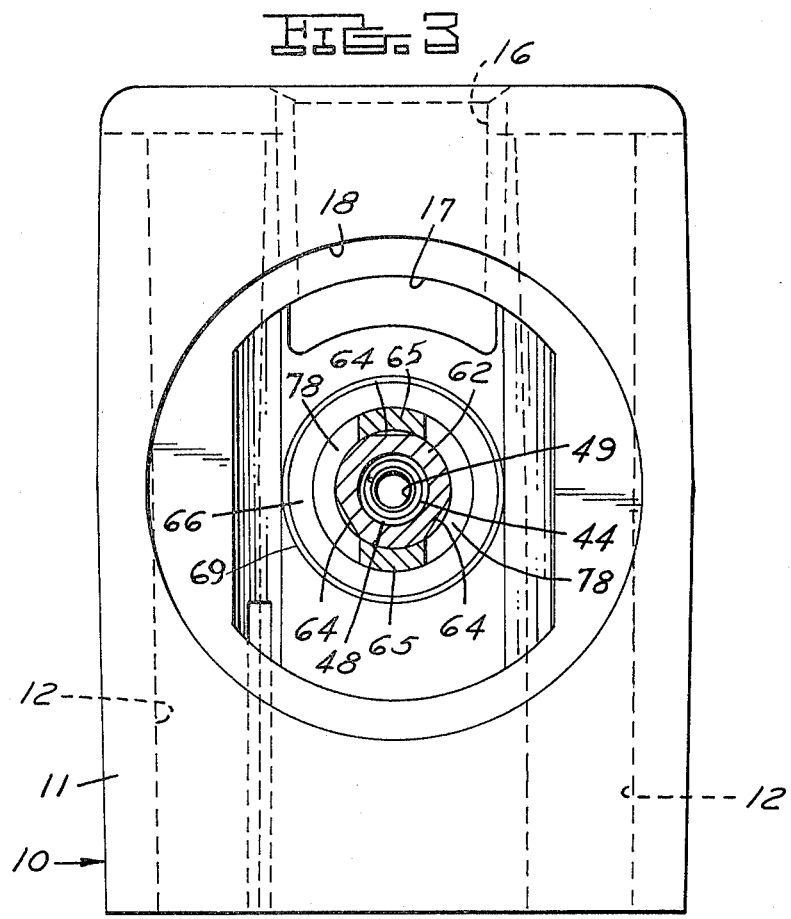
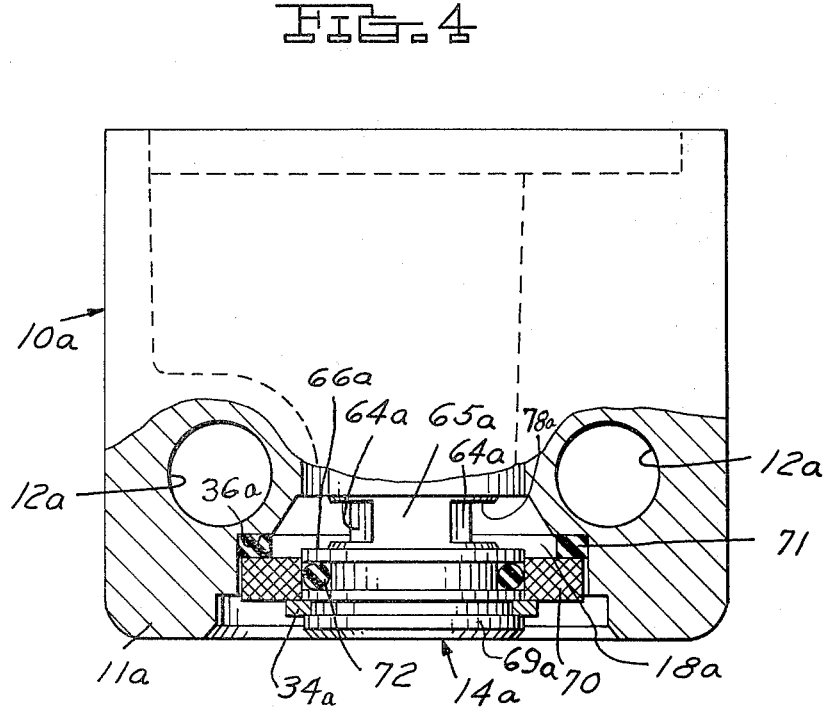

4,407,323

CARTRIDGE TYPE PILOT VALVE

TECHNICAL FIELD

This invention relates generally to air valves, and more particularly, to a three-way, normally closed only, pilot valve for use in controlling the flow of pilot air to a directional flow control valve for operating the main spool valve thereof. The type of directional flow control valves which may be controlled by the pilot valve of the present invention includes four-way valves, three-way valves, two-way valves, and the like.

BACKGROUND ART

It is known in the air valve art to provide pilot valves for operating four-way valves, three-way valves, two-way valves, and the like. A disadvantage of the pilot air valves is that their arrangement and construction requires considerable time to dismantle the valves for repair purposes when replacing a pilot valve element. A further disadvantage of the prior art pilot air valves is that they are complicated structurally and expensive to manufacture and repair. Examples of the prior art pilot valves are shown in U.S. Pat. Nos. 4,100,519, 4,271,868 and 4,298,027.

DISCLOSURE OF THE INVENTION

In accordance with the present invention, a three-way normally closed only pilot air valve is provided for supplying pressurized pilot air to a directional flow control air valve, such as a four-way valve, a three-way valve, a two-way valve or the like, for shifting the main valve spool of such valves.

The valve of the present invention includes a valve body having a pilot air inlet port, a cylinder port, and an exhaust port. The valve body has a bore formed axially therethrough, and a tubular valve retainer member having an axial bore formed therethrough is releasably mounted in said valve body bore and it extends therethrough. A first passageway is formed through the valve body and the valve retainer member, and it connects the pressurized pilot air inlet port to the cylinder port. A second passageway is formed through the valve body and the valve retainer member, and it connects the cylinder port with the exhaust port.

A poppet valve spool is movable mounted in the valve retainer member for movement between a normally closed inoperative position, and an operative position, so that when the poppet valve spool is in the inoperative position, it blocks the first passageway and opens the second passageway, and when it is in the operative position, it opens the first passageway and blocks the second passageway. The poppet valve spool is movable by a suitable operator, as a solenoid, from the inoperative position to the operative position. The poppet valve spool is returned to the inoperative position by a return spring and an air assist provided by pressurized air exhausting from the cylinder port to the exhaust port. The valve retainer member is provided with a first sharp edged valve seat disposed between the inlet port and the cylinder port, and a second sharp edged valve seat disposed between the cylinder port and the exhaust port. A pair of longitudinally spaced apart, annular valve members are carried on the poppet valve spool for alternative engagement with the first and second sharp edged valve seats when the poppet valve spool is in the inoperative and operative positions.

BRIEF DESCRIPTION OF THE DRAWINGS

FIG. 3 is a bottom view of the valve structure shown in FIG. 2, taken along the line 3—3 thereof, and looking in the direction of the arrows.

FIG. 4 is a view similar to FIG. 2, and showing a modification of the pilot valve wherein the exhaust air is exhausted down through the bottom of the valve.

THE BEST MODE OF CARRYING OUT THE INVENTION

Figure 1:
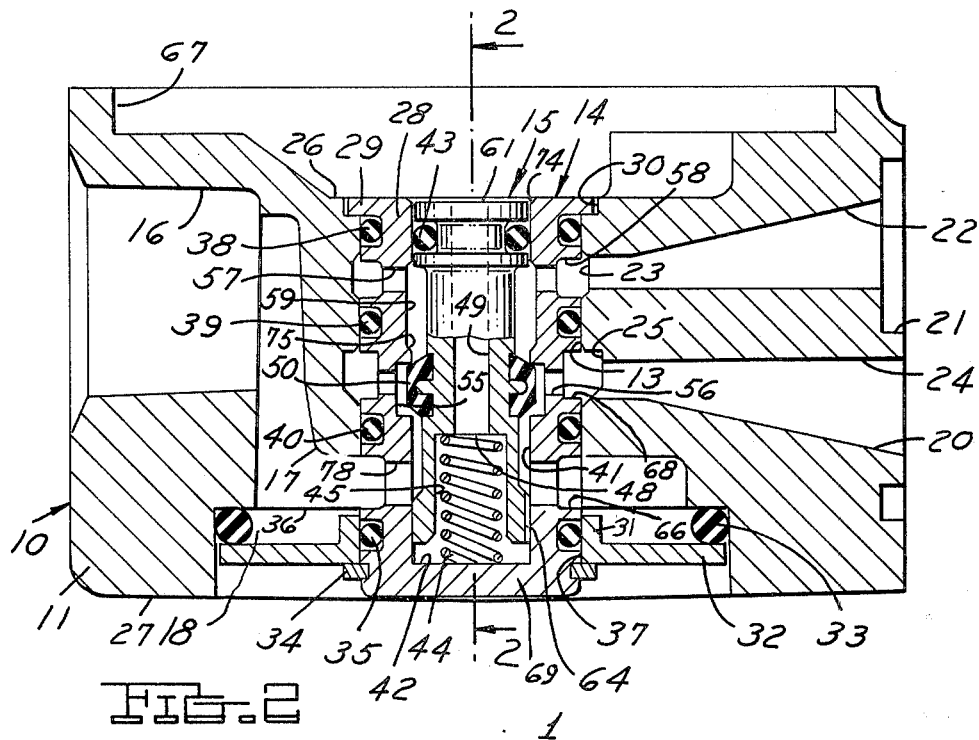
FIG. 1 is an elevation section view of the pilot valve structure illustrated in FIG. 2, taken along the line 1—1 thereof, and looking in the direction of the arrows.
Figure 2:
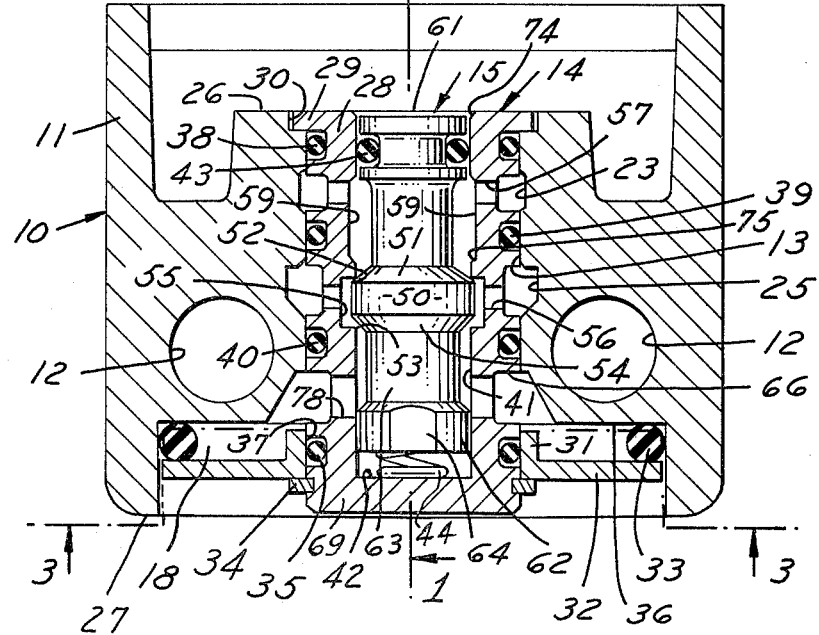
FIG. 2 is an elevation section view of the pilot valve structure illustrated in FIG. 1, taken along the line 2—2 thereof, and looking in the direction of the arrows.

Referring now to the drawings, and in particular to FIGS. 1 and 2, the numeral 10 generally designates a three-way, normally closed only, pilot valve made in accordance with the principles of the present invention. The pilot valve 10 includes a valve body 11 which is adapted to be operatively mounted on a fluid flow control valve to be controlled by the pilot valve of the present invention, as for example, a four-way valve, a three-way valve, a two-way valve and the like. As shown in FIGS. 2 and 3, the valve body 11 is provided with a pair of mounting holes 12 for the reception of suitable mounting bolts to mount the pilot valve 10 onto a fluid flow control valve which it would control.

As shown in FIG. 1, the pilot valve 10 is provided with an axial bore 13 which is formed through the valve body 11. A tubular valve retainer member, generally indicated by the numeral 14, is releasably mounted in the bore 13 and it extends completely through the bore 13. As shown in FIGS. 1 and 2, a poppet valve spool, generally indicated by the numeral 15, is movably mounted in the tubular valve retainer member 14, as more fully described hereinafter.

As shown in FIG. 1, the valve body 11 is provided with an exhaust port 16 which is connected by a passage 17 to an exhaust chamber 18, which is formed in the lower end of the valve body 11, and which communicates with the lower end of the valve body bore 13.

As shown in FIG. 1, the pilot valve 10 is provided with a pilot air inlet port 21 which would be operatively connected to a suitable source of pilot air under pressure or connected to a passageway in the fluid flow control valve which would be controlled by the pilot valve 10, for the reception of main line pressurized air from the same source that would be used to supply line pressure to said flow control valve. The inner end of the pilot air inlet port 21 is connected by a passage 22 to an annular groove 23 which is formed in the wall of the axial bore 13 that is formed through the valve body 11 perpendicular to the longitudinal axes of the inlet port 21.

As shown in FIG. 1, a cylinder or outlet passage 24 is formed in the valve body 11 with the inner end communicating with an annular groove 25 formed in the wall of the valve body axial bore 13. The outer end of the cylinder passage 24 comprises a port 20 which would be connected to the valve spool chamber of the fluid flow control valve controlled by the valve 10.

As shown in FIGS. 1 and 2, the tubular valve retainer member 14 comprises an elongated tubular body 28 which is removably mounted in the axial bore 13 in the valve body 11. The tubular body 28 of the valve body retainer member 14 extends from the recessed upper end 26 of the valve body 11 down through the bore 13, and through the exhaust chamber 18 and to the bottom end 27 of the valve body 11. The upper end of the tubular valve retainer body 28 is provided with an annular, radially extended shoulder 29 that is seated in an enlarged diameter valve body bore 30 which communicates with the upper end of the axial bore 13. The tubular valve retainer body 28 is assembled into the valve body bore 13 by slidably mounting it into the bore 13 from the upper end thereof and moving it inward until the flanges 29 seats on the shoulder formed by the junction of the large diameter bore 30 with the bore 13. The tubular valve retainer body 28 is releasably secured in the last mentioned position in the bore 13 by the following described structure.

As shown in FIGS. 1 and 2, the lower cylindrical end of the tubular valve retainer body 28 is slidably mounted through the bore 30 of a longitudinal cylindrical flange 31. The flange 31 is integral with a transverse annular flange 32 which is perpendicular to the longitudinal flange 31 and which extends radially outward adjacent the outer wall of the exhaust chamber 18. A suitable O-ring seal 33 is operatively mounted between the inner face of the annular transverse flange 32 and the inner end wall 36 of the exhaust chamber 18. A suitable O-ring 35 is mounted in a peripheral groove formed around the cylindrical lower end of the tubular valve retainer body 28, and it sealingly engages the bore 37 of the longitudinally extended cylindrical flange 31. The longitudinal cylindrical flange 31, and the integral, annular flange 32, function together as a retainer member for the tubular valve retainer member 14, together with a releasable retainer ring 34 which is mounted adjacent the lower outer face of the annular flange 32. The retainer ring 34 is seated in a suitable groove formed around the periphery of the lower tubular end of the tubular valve retainer body 28.

As shown in FIGS. 1 and 2, the tubular valve retainer body 28 is provided with longitudinally spaced apart O-rings 38, 39 and 40 which are operatively mounted in grooves around the outer periphery of the valve retainer body 28, in longitudinal positions on opposite sides of the annular grooves 58 and 68. The tubular valve retainer body 28 is provided with an axial valve spool bore 41 in which is movably mounted the poppet valve spool 15. As shown in FIGS. 1 and 2, the bore 41 in the tubular valve retainer body 28 extends downwardly from the upper end thereof to the bottom end wall 42. As viewed in FIGS. 1 and 2, the upper end portion of the poppet valve spool 15 is provided with an O-ring seal 43 which is operatively mounted in a groove formed around the periphery thereof, and it sealingly engages the bore 41.

As shown in FIG. 1, the poppet valve spool 15 is normally biased to the normally closed, inoperative position by a return spring 44 which is mounted in an axial bore 45 that extends inwardly into the poppet valve spool bore lower end portion 62, and which terminates at an upper end wall 48. The lower end of the return spring 44 seats against the end wall 42 of the valve retainer bore 41, and the upper end thereof seats against the inner end wall 48 of the poppet valve spool bore 45. The bore 45 in the lower end of the poppet valve spool 15 communicates with an axial vent bore 49 that extends through the remaining portion of the poppet valve spool.

As shown in FIG. 2, the poppet valve spool 15 is provided with a longitudinal, centrally mounted, annular molded valve member 50 which has formed on the upper and lower sides thereof conical, peripheral valve elements 51 and 54, for alternately engaging the circular sharp edged valve seats 52 and 53 which are formed in the valve bore 41 in the valve retainer 28, in longitudinally spaced apart positions created by an annular enlarged bore 55 in the valve bore 41. In the normally closed position shown in FIGS. 1 and 2, the upper valve element 51 engages the upper valve seat 52. When the poppet valve spool 15 is moved downwardly to an operative position against the pressure of return spring 44, by a suitable operator engaging the upper end 61 of the valve spool 15, the lower valve element 54 engages the lower valve seat 53, as more fully explained hereinafter.

A first passageway is formed through the valve body 11 and the valve retainer member 14 to connect the pressurized pilot air inlet port 21 to the cylinder port 20. The first passageway includes the passage 22 in the valve body 11, the enlarged bore portion 23 in the valve body bore 13, the annular groove 58 formed around the outer periphery of the tubular valve retainer body 28, and a plurality of radial bores 57 formed through the valve retainer body 28 to connect the annular groove 58 with an enlarged bore 59 formed in the valve bore 41 in the valve retainer body 28. Said first passage is normally closed at the lower end of said enlarged retainer valve bore 59 when the poppet valve spool 15 is in the normally closed, inoperative position shown in FIGS. 1 and 2. When the poppet valve spool 15 is moved downwardly to move the valve element 54 against the valve seat 53, said first passageway is opened to the cylinder port 20, through the enlarged bore 55 formed in the valve bore 41, the plurality of radial bores 56 formed in the valve retainer body 28, the annular groove 68 formed around the outer periphery of the valve retainer body 28, the enlarged bore 25 formed in the valve body bore 13, and the passage 24 formed in the valve body 11.

A second passageway is formed through the valve body 11 and the tubular valve retainer member 14, and it connects the cylinder port 20 with the exhaust port 16. The second passageway is normally opened between the cylinder port 20 and the exhaust port 16 when the poppet valve spool 15 is in the normal inoperative position shown in FIGS. 1 and 2. The second passageway between the cylinder port 20 and the exhaust port 16 includes the passage 24 in the valve body 11, the enlarged valve body bore 25, the annular groove 68 formed around the outer periphery of the valve retainer body 28, the plurality of valve retainder radial ports 56, the enlarged valve retainer bore 55, the valve retainer bore 41, the pair of radial arcuate grooves 78 in the valve retainer body 28, the annular groove 66 formed around the lower end of the valve retainer body 28, the exhaust chamber 18, and the passage 17 which is connected to the exhaust port 16. The second passageway is closed when the poppet valve spool 15 is moved downwardly to engage the lower valve element 54 with the sharp edged valve seat 53.

As shown in FIGS. 1, 2 and 3, the cylindrical lower end 62 of the poppet valve spool 15 is provided with a plurality of flat surfaces 64 which are evenly spaced around the periphery thereof, and which extend longitudinally upward to the reduced diameter portion 63 of the poppet valve spool 15. The flat surfaces 64 permit air being exhausted from the cylinder port 20 to the exhaust port 16 to go down past the flat portions 64 and get under the poppet valve spool 15 and provide an upward air assist to the return spring 44, to move the poppet valve spool 15 back to the initial inoperative position shown in FIGS. 1 and 2. In FIG. 3, the numeral 65 indicates the longitudinal, interconnecting portions of the valve retainer body 28 which connect the lower portion 69 to the upper portion of said valve retainer body 28, and permit the formation of the two arcuate passages 78 and the annular groove 66 in the valve retainer body 28.

The poppet valve spool 15 is forced into the one-piece tubular valve retainer member 14, from the upper end thereof, and it cannot be removed without destroying the spool 15. The lead angle of the lower valve element 54 on the annular valve element member 50 is approximately 30° off the transverse axis of the spool 15, and the chamfer 74 at the entrance end of the valve retainer bore 41 is formed at an angle of appoximately 30° from the vertical axis of the retainer body 28. The angle at the lower end of the enlarged valve retainer bore portion 59, where it joins with the valve retainter bore 41 is indicated by the numeral 75, and it is formed to an angle of 30° from the vertical axis of the valve retainer body 28. The aforedescribed radial angles permit the poppet valve spool 15 to be easily forced into the bore 41 of the tubular valve retainer body 28, but the spool 15 cannot be removed in the opposite or upward direction without destroying the same. The reverse or trailing angled valve element 51 on the annular valve element 50 is also formed at about 30° angle from the transverse axis of the valve spool retainer body 28.

It will be seen that when it is necessary to replace the poppet valve spool 15 for any reason that the tubular valve retainer 14 and the poppet valve spool 15 may be quickly and easily removed by releasing the retainer ring 34 and removing the tubular valve retainer 14 and the captive poppet valve spool 15, as a unit, whereby a new tubular valve retainer 14 and poppet valve spool 15 section can be quickly and easily inserted in the valve body 11 and secured in place. The last described quick replacement function of the poppet valve spool 15 is advantageous in that the valve 10 may be quickly and easily repaired with a minimum of lost working time for the valve.

In use, the valve 10 is mounted by suitable mounting bolts through the bores 12 to a directional flow control air valve which is to be pilot air operated by the valve 10 in at least one direction. A suitable operator for the pilot valve spool 15 would be mounted on the upper end of the valve body 11, as viewed in FIGS. 1 and 2. A suitable operator for the poppet valve spool 15 would be any conventional solenoid, as for example, the solenoid illustrated in either one of U.S. Pat. Nos. 4,100,519 and 4,298,027. The chamber 67 in the upper end of the valve body 11 would receive the plunger and associated structure of the solenoid for moving the poppet spool valve 15 downwardly from the inoperative position shown in FIG. 1, to an operative position with the lower valve element 54 in engagement with the lower vavle seat 53. It will also be understood that any other type of operator may be used, as for example, a remote air operated operator, a manual operator, and the like.

It will be seen, that when the poppet valve spool 15 is in the normally closed, inoperative position of FIGS. 1 and 2, that the cylinder port 20 is connected by the aforementioned second passageway to the exhaust port 16. Pressurized pilot air cannot pass through the aforedescribed first passageway since it is blocked by the valve member 50 having its upper valve member element 51 seated against the upper sharp edged valve seat 52. When the poppet valve spool 15 is moved downwardly from the inoperative position shown in FIGS. 1 and 2, the lower valve member element 54 of the valve element 50 on the poppet valve spool 15 is seated against the lower valve seat 53, and the first described passageway is open to allow pressurized pilot air to flow from the inlet port 21 and out through the cylinder port 20, while blocking the aforedescribed second passage— from the inlet port 21 and out through the cylinder port 20, while blocking the aforedescribed second passageway. When the poppet valve operator moving the pilot spool valve 15 downwardly is de-energized or released, the return spring 44 returns the spool valve 15 to the upward normally closed, inoperative position shown in FIGS. 1 and 2, to again close the flow of pressurized pilot air to the first passageway, and open the second passageway between the cylinder port 20 and the exhaust port 16.

FIG. 4 shows a modification of the pilot air valve 10 illustrated in FIGS. 1, 2 and 3, and the parts of the modification of FIG. 4 which are the same as the first described embodiment of FIGS. 1, 2 and 3, have been marked with the same reference numerals followed by the small letter "a". The difference between the modified valve structure 10a of FIG. 4, and the first described valve 10, is that valve 10a is not provided with an exhaust port 16 throght the side of the valve body 11a. The valve 10a is provided with the same first described passageway as in valve 10 between the pilot air inlet port and the cylinder port, but the second passageway allows the exhaust air to be exhausted from the lower end of the valve retainer bore 41 and out through the arcuate grooves 66a and into the lower exhaust chamber 18a, which comprises an exhaust port in the lower end of the valve body 11a. The exhaust chamber 18a exhausts out through the bottom of the valve body 11a through a circular filter 70 which is mounted around the outer periphery of the lower end of the tubular valve retainer 14a. A suitable O-ring seal 71 is mounted between the upper side of the filter 70 and the inner end wall 36a of the exhaust chamber 18a. A suitable O-ring seal 72 is mounted in a groove around the lower end of the valve retainer 14a and it engages the inner periphery of the filter ring 70. The filter ring 70 is retained in place by means of a suitable, releasable retainer ring 73 which is mounted in an annular groove formed around the lower end of the valve retainer 14a.

INDUSTRIAL APPLICABILITY

The three-way normally closed only, pilot valve of the present invention is adapted for use in industrial air applications for controlling the flow of pilot air to a pilot air operated directional flow control valve for operating the main valve spool thereof. The types of directional flow control valves which may be controlled by the pilot valve of the present invention includes four-way valves, three-way valves, two-way valves, and the like.

I claim:
1. A three-way, normally closed only, pilot air valve including a valve body with a pressurized pilot air inlet port, a cylinder port, and an exhaust port, characterized in that:
   (a) said valve body has a bore formed therethrough;

(b) a one-piece tubular valve retainer member, having an axial bore formed therethrough, is releasably mounted in said valve body bore in a position between the inlet port, the cylinder port, and the exhaust port, and it has a tubular side wall and an upper end and a lower end;

(c) a first passageway means is formed through the valve body and the tubular valve retainer member and it connects said pressurized pilot air inlet port to the cylinder port;

(d) a second passageway means is formed through the valve body and the tubular valve retainer member and it connects said exhaust port to the cylinder port;

(e) a first circular sharp edged poppet valve seat is formed in the tubular valve retainer member axial bore in the first passageway means, and a second circular sharp edgeds poppet valve seat is formed in the tubular valve retainer member axial bore in the second passageway means;

(f) a poppet valve spool is movably mounted in said tubular valve retainer member axial bore and movable between a normally closed inoperative position and an open operative position;

(g) said poppet valve spool is provided with a first conical annular valve member element and a longitudinally spaced apart second conical annular valve member element for sealing engagement with the first and second circular sharp edged poppet valve seats, respectively, so that when the poppet valve spool is in the normal inoperative position the first conical annular valve member element is seated on the first circular sharp edged poppet valve seat and the poppet valve spool blocks communication through the first passageway means between the inlet port and the cylinder port through the tubular valve retainer member axial bore while simultaneously the second conical annular valve member is in the unseated position, with communication open between the cylinder port and the exhaust port through the tubular valve retainer axial bore to allow the air under pressure entering said cylinder port to be exhausted out said exhaust port, and when the poppet valve spool is moved to the operative open position the second conical annular valve member element is seated on the second circular sharp edged poppet valve seat and the poppet valve spool blocks communication through the second passageway means, to block exhausting of air from the cylinder port to the exhaust port, and the first conical annular valve member element is unseated to open communication between the pilot air inlet port and the cylinder port through the first passageway means to allow pressurized pilot air to flow from the pilot air inlet port to the cylinder port;

(h) the poppet valve spool is normally biased to the normally closed inoperative position by means which includes a return spring means mounted in the lower end of the tubular valve retainer member axial bore and engaged with the lower end of the poppet valve spool; and, (i) retainer means releasably secures the tubular valve retainer member in the valve body bore.

2. A three-way, normally closed only, pilot air valve as defined in claim 1, characterized in that:
(a) said retainer means for releasably securing the tubular valve retainer member in the valve body bore includes a flange on one end of the tubular valve retainer member which seats on the valve body and a releasable retainer member and a retainer ring mounted on the other end of the tubular valve retainer member and engageable with the other end of the valve body.

3. A three-way, normally closed only, pilot air valve, as defined in claim 1, characterized in that:
(a) the lower end of the poppet valve spool is engageable by air exhausting through the second passageway means to assist the return spring means for moving the poppet valve spool from the open operative position to the normally closed inoperative position.

4. A three-way, normally closed only, pilot air valve, as defined in claim 3, characterized in that:
(a) the exhaust port connected to said first passageway means is positioned in the side of the valve body.

5. A three-way, normally closed only, pilot air valve, as defined in claim 3, characterized in that:
(a) the exhaust port is positioned in the bottom end of the valve body.

6. A three-way, normally closed only, pilot air valve, as defined in claim 2, characterized in that:
(a) said retainer flange is formed on the upper end of the tubular valve retainer member and with the poppet valve spool being mounted through the valve retainer member, and the retainer ring is positioned on the lower end of the tubular valve retainer member.

7. A three-way, normally closed only, pilot air valve, as defined in claim 1, characterized in that:
(a) the poppet valve spool is insertable into the tubular valve retainer member axial bore without damage to the valve spool, but it is not removable without damaging the valve spool so as to make the valve spool a captive of the tubular valve retainer member once the valve spool is mounted therein, and the valve spool must be removed as a unit with the tubular valve retainer member when it is desired to remove either the tubular valve retainer member or the valve spool member.

* * * * *